United States Patent Office 3,346,538
Patented Oct. 10, 1967

3,346,538
HIGH MOLECULAR WEIGHT DICHLOROACET-
ALDEHYDE HOMOPOLYMERS AND METHOD
OF PREPARATION
Clarence L. Sturm, Donald E. Hudgin, and Irving Rosen,
Painesville, Ohio, assignors to Diamond Alkali Company, Cleveland, Ohio, a corporation of Delaware
No Drawing. Filed July 29, 1963, Ser. No. 298,409
13 Claims. (Cl. 260—67)

This invention relates to novel halogen-containing thermoplastic compositions. More particularly, it relates to high molecular weight dichloroacetaldehyde polymers and to the method for preparing them.

It has long been known in the art that trimers and low-molecular weight linear polymers may be prepared from dichloroacetaldehyde monomer. As reported by O. Jacobsen, Ber. 8, p. 87 (1875), for example, dichloroacetaldehyde will form, in the presence of concentrated hydrochloric or sulfuric acid, crystalline trimers which melt sharply within the range of 40° to 50° C. R. Friedrich has reported, Ann. 206, p. 251 (1881), that, when allowed to stand for some length of time in a sealed tube, dichloroacetaldehyde will form a polymer which rapidly decomposes and reverts back to the monomer when subjected to elevated temperatures.

More recently, as reported in Can. J. Chem. 37, pp. 1722–26, A. Novak and E. Whalley have determined the structure of dichloroacetaldehyde polymers from infrared spectra and X-ray diffraction patterns obtained for materials prepared as described above. Crystalline in nature, these polymers are found to be analogous in structure to oxymethylene polymers. They are low in molecular weight and cannot be processed into useful plastic articles, being thermally unstable as evidenced by their quick reversion to the monomer when exposed in many instances to even slightly elevated temperatures.

It has now been found that useful dichloroacetaldehyde polymers being much higher in average molecular weight and exhibiting vastly improved thermal stability characteristics by comparison to heretofore known dichloroacetaldehyde polymers conveniently may be prepared by contacting, under substantially anhydrous conditions, dichloroacetaldehyde monomer with an ionic-type polymerization catalyst at a temperature ranging from about $-80°$ to $+35°$ C. and for a time sufficient to convert the said dichloroacetaldehyde monomer to polymer.

The polymer products obtained are white, finely granular, linear thermoplastic materials comprising repeating dichloroacetaldehyde monomer units having the structure

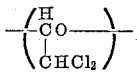

These polymers which are, as prepared, non-crystalline in nature possess inherently a high degree of fire-retardancy because of their substantial chlorine content. They exhibit a high degree of polymerization, i.e., the number of repeating monomer units as represented by the structure above is at least 180 in each chain of the polymer. Being high in molecular weight, these polymers possess vastly improved physical properties over the previously known dichloroacetaldehyde polymers and may easily be fabricated by conventional processing conditions into useful plastic articles, e.g., films, moldings and the like, which articles are clear in appearance, are tough and durable and possess inherently a high degree of fire retardancy.

As reported herein, the molecular weight of the polymer products of this invention is determined by measuring at 25° C. the viscosity of the polymer in tetrahydrofuran relative to that of the tetrahydrofuran obtained in the same manner. The time of efflux through a viscometer is measured for the solvent and for the solution of polymer in the solvent. The concentration of polymer in the solution is 0.1 g. per 100 ml. of solution. The reduced viscosity is then calculated as follows:

$T_0$=solvent flow time in seconds
$T_1$=solution flow time in seconds
Relative viscosity=$T_1/T_0$
Specific viscosity=relative viscosity minus 1
Reduced viscosity=(specific viscosity)/C.

where C is the concentration as expressed in grams of polymer per 100 ml. of solution.

Using the reduced viscosity value, the molecular weight of the polymer is then calculated employing a modified Mark-Houwink equation expressing the empirical relation between viscosity and molecular weight of a linear polymer as follows $\eta = K'M^a$ wherein $\eta$=reduced viscosity and $K'$ and $a$ are constants determined for the particular polymer in the particular solvent employed in the viscosity determination. For $K'$ is substituted the value, $1 \times 10^{-3}$, which has been reported for tetrahydrofuran; and for $a$ is used 0.7, which value closely approximates the value for most polymer systems.

In order to produce finished plastic articles having useful property levels, the polymers of this invention usually have a reduced viscosity of at least 1.0, which value corresponds to an average polymer molecular weight of approximately 20,000 or a degree of polymerization of about 180. Polymers employed to prepare products having the most useful property levels generally have a reduced viscosity of at least 1.25 which value corresponds to an average polymer molecular weight of about 30,000.

In addition to comparative molecular weight determinations carried out as described hereinabove, the chemical structure of the polymers of this invention has also been investigated by infrared analysis techniques to further differentiate these high-molecular weight materials from heretofore known dichloroacetaldehyde polymers. As stated previously, these polymers are structurally analogous to oxymethylene polymers, i.e., they are composed of repeating dichloroacetaldehyde monomer units joined together in linear chains terminated at both ends by hydroxyl groups. As will be recognized by those skilled in the field of infrared spectroscopy, the presence of the hydroxyl or C—OH group in an organic material, such as a polymer, can be observed in its spectrum, the strength or intensity of the infrared absorption band of this group being directly correlated to the number of such groups present in the polymer. Spectra were obtained for the polymers of this invention and for a dichloroacetaldehyde polymer prepared as previously reported, employing a Perkin-Elmer spectrophotometer, Model 21, fitted with a calcium fluoride prism and operated under standard conditions. Sample specimens of the polymers of this invention analyzed were films cast from solutions of the polymers in tetrahydrofuran; mulls of the low-molecular weight polymers in heavy white mineral oil (U.S.P.) were used. The different polymer spectra obtained were compared at the wavelength region of 2.88 microns, at which region the C—OH absorption band appears. This band is fairly strong in the spectrum of the previously known polymer and can be measured, but is absent in the spectra of the polymers of this invention. Since in film specimens of equivalent thickness the intensity of the C—OH band diminishes as the polymer molecule increases in size, and the concentration of the end-group hydroxyls is thus diluted, the absence of the C—OH absorption band in the spectra of the polymers of this invention indicates that these materials are of much higher molecular weight than the previously known polymer.

In one embodiment of this invention, polymers of the desired high molecular weight may be conveniently prepared in good yield (60 to 80 percent monomer conversion) by contacting the dichloroacetaldehyde monomer in the fluid state with the catalyst in the absence of a solvent or other liquid reaction medium. In this bulk polymerization method, the reaction temperatures generally may range between −40° and +30° C., with reaction temperatures ranging from −10° to +10° C. being especially preferred. Reaction times generally may vary from 1 hour to 22 hours, with reaction times of 2 to 5 hours being typical.

Alternatively, the polymerization suitably may be conducted in an anhydrous organic liquid which is a solvent for the monomer. Solvents preferably employed are aliphatic hydrocarbons, e. g., hexane, cyclohexane, heptane and the like; or chlorinated solvents such as methylene chloride, chloroform, carbon tetrachloride, trichlorethylene, chlorobenzene and the like. In most instances, the polymer product formed is essentially insoluble in the solvent used in the reaction and may be recovered easily therefrom by filtration. The solvent may be used generally in a ratio of about 0.1 to 5 moles per each mole of monomer. However, concentrations of 1 to 2 moles of solvent per each mole of monomer have usually been found satisfactory and are preferred. The reaction may be conducted generally at temperatures within the range of −80° to +35° C. for a time period of from 0.5 hour to 24 hours. Reaction temperatures within the range of −40° to +25° C. and reaction times of 1 to 5 hours are preferably employed.

The polymerization reaction is effected in the presence of an ionic-type polymerization catalyst. Suitable compounds of this type include Lewis acids, e. g., metal halides such as the halides of aluminum, boron, tin, titanium, zirconium, strontium, niobium and the like, and coordinate complexes of such metal halides with organic compounds in which oxygen or sulfur is the donor atom. In preparing polymers of this invention in the absence of solvent, as outlined hereinabove, the described coordinate complexes of metal halides with organic compounds are most suitably employed, with such coordinate complexes of boron trifluoride being especially preferred.

A suitable boron trifluoride complex may be, for example, a complex of boron trifluoride with an alcohol, a phenol, an acid, an ether, an acid anhydride, an ester, a ketone, an aldehyde, a dialkyl sulfide, a mercaptan, etc. Boron trifluoride complexes with ethers such as diethyl ether, dibutyl ether and the like are especially preferred for use.

In general, the particular catalyst employed in the process of this invention may be used in an amount ranging from about 0.001 to about 0.4 molar percent, i.e., from about 0.01 to 4 millimols for each mole of monomer employed. However, an amount within the range of about 0.04 to 1 millimol per mole of monomer is preferably employed.

It has been found that trace contaminants, such as water, in the reaction mixture, substantially inhibit monomer conversion to the desired polymer in good, practical yields. Therefore, it is essential that the polymerization process be conducted under anhydrous, or substantially anhydrous conditions. For most satisfactory polymer products, it has been established that the reaction ingredients, i.e., the monomer, or the monomer and solvent in combination, should contain no more than 50 p.p.m. of water. The monomer is advantageously dried herein prior to polymerization by distillation over a dehydrating agent such as phosphorus pentoxide and by passage of the monomer vapors formed through an absorbent such as molecular sieves. The solvent may be dehydrated by standard distillation and drying methods.

The dichloroacetaldehyde polymers of this invention are normally solid, thermoplastic materials exhibiting vastly improved physical properties over those dichloroacetaldehyde polymers previously known in the art. In contrast to such previously known materials which have a maximum molecular weight of about 5000 and cannot be formed into any cohesive articles, the polymers of this invention have an average molecular weight of at least 20,000 and may be fabricated easily and economically into useful plastic articles, e.g., films, moldings, etc., which are clear in appearance, are chemically resistant and exhibit a high degree of fire retardance. In processing operations, these polymers may be utilized unmodified, or may have incorporated therewith additives such as antioxidants, fillers, pigments, stabilizers and the like, which are normally used when processing thermoplastic polymers. To further improve their thermal stability, the polymers of this invention likewise may be stabilized prior to processing, as by "capping" of their end groups, especially if in processing, these materials will be subjected to elevated temperatures for long periods of time.

In order that those skilled in the art may more completely understand the present invention and the preferred methods by which the same can be carried into effect, the following specific examples are offered.

*Example 1*

A 100-milliliter, three-necked flask fitted with an agitator, a thermometer, a rubber serum cap for injecting the reaction ingredients and with nitrogen inlet and outlet tubes is purged with nitrogen. Twenty-eight and three-tenths g. (0.25 mole) of freshly distilled anhydrous dichloroacetaldehyde and 23.0 g. (0.25 mole) of anhydrous trichloroethylene are injected into the flask, the monomer is dissolved in the solvent with agitation and the flask and its contents are then cooled to 0° C. Five-tenths ml. of an 0.5 molar solution of aluminum bromide in toluene is injected into the solution. After the catalyst addition, some solid polymer is formed immediately. The reaction mixture is maintained at 0° C. for a time period of 2 hours, after which it is quenched with approximately 100 ml. of methanol to neutralize and deactivate the catalyst. The treated reaction mixture is then filtered to separate the dispersed polymer solids. The separated polymer product is washed well with methanol and finally dried at 50° C. under vacuum. There is recovered 15.6 g. of a fine, white polymeric product, indicating 55 percent conversion of monomer in the reaction. The reduced viscosity of the product is 1.75 as determined at 25° C. on a 0.1 percent solution of the polymer in tetrahydrofuran, which viscosity value corresponds, upon computation as described herein, to an average polymer molecular weight of about 51,000, i.e., a degree of polymerization (DP) in the polymer of approximately 455. In the spectrum obtained by infrared analysis on a film of this polymer cast from tetrahydrofuran solution, a C—OH band does not appear at a wavelength of 2.88 $\mu$. Completely transparent cast polymer films are prepared from solutions of the polymer in tetrahydrofuran. The polymer product of this example, unlike the polymers prepared by previously known methods, may be molded at 175° to 195° C. under pressures of 4000 to 6000 p.s.i., to prepare tough, clear specimen moldings.

*Example 2*

A quantity of distilled dichloroacetaldehyde monomer is stored in a sealed container for 60 days at room temperature. At the end of the storage period, a waxy tan-colored solid material, smelling strongly of monomer, is recovered. It is ground under water to remove the unreacted monomer, is filtered and dried, and a fine, white, powdery polymer substance is obtained.

A portion of this dried product is placed in a sealed container and observed periodically. Using another portion of the product, a solution is prepared in tetrahydrofuran which is then cast onto a glass plate. Upon evaporation of the solvent a cloudy, film-like structure is obtained. This film is very brittle and has no strength as it cannot be peeled from the glass plate without breaking apart.

Using, as a sample specimen, a mull of the dried product in heavy white mineral oil, a spectrum of polymer is obtained by infrared analysis. This spectrum shows a fairly strong C—OH absorption band (at a wavelength of 2.88 microns). By measuring the intensity of this band against reference spectra, the dried polymer product of this example is calculated to have a degree of polymerization of 45, or an average molecular weight of around 5000. The polymer of this example has a reduced viscosity of less than 0.1.

The stored portion of the dried polymer product of this example is found after a short time interval to be decomposing, as evidenced by a strong monomer odor. Likewise, it gradually becomes tan in color and again assumes a waxy appearance.

Example 3

Employing polymerization equipment similar to that of Example 1, a dichloroacetaldehyde polymer is prepared in the absence of solvent. In this example, after 54 ml. (75.5 g.) of freshly distilled dichloroacetaldehyde has been charged into the polymerization flask and then cooled to 0° C. with agitation, 0.02 ml. of boron trifluoride etherate (0.16 millimol catalyst per mole of monomer) is added to the monomer. The agitated reaction mixture is then maintained at 0° C. for a time period of 3 hours, after which agitation is stopped and the mixture is allowed to react for an additional 2-hour period. The mixture is then cooled by means of a Dry Ice-acetone bath and methanol is added to deactivate the catalyst. The clear polymer mass formed is isolated, ground into particulate polymer, leached well with methanol and then dried under vacuum. The dried polymer weighs 62.5 g. (70 percent yield) and has a melting point of approximately 240° C. It has a reduced viscosity of 3.88, determined as described previously. This viscosity value corresponds to an average polymer molecular weight of about 135,000 (DP=1200). Infrared analysis shows the polymer product of this example to be similar in structure to the product of Example 1. No C—OH absorption band is found in the spectrum in contrast to the strong C—OH band appearing in the spectrum of the low-molecular weight dichloroacetaldehyde polymer of Example 2. Completely transparent films and moldings are prepared from the polymer product of this example which are similar in appearance and properties to those prepared from the product of Example 1.

Example 4

Using the polymerization equipment and procedure, as outlined in Example 3, a dichloroacetaldehyde polymer is prepared. In this example, 27 ml. (37.7 g.) of monomer and 0.5 millimol of niobium pentachloride catalyst are employed, the catalyst being added to the monomer as a slurry in carbon tetrachloride. After addition of the catalyst, the reaction mixture is maintained at 0° C. for a time period of 3 hours. Methanol is then added to the reaction mixture to deactivate the catalyst. The solid polymer mass is isolated and ground in a Waring Blendor in a hydrochloric acid-methanol mixture. The particulate polymer obtained is then separated, washed several times with methanol and dried under vacuum. The dried polymer recovered weighs 27.2 g. (72 percent yield) and melts at approximately 235° C. It is similar in structure to the products of Examples 1 and 3, as indicated by its infrared spectrum. It has a reduced viscosity of 2.28 indicating an average polymer molecular weight of approximately 77,000. The polymer product of this example is processed as the products of the previous examples to prepare tough and transparent films and molded products.

Example 5

A dichloroacetaldehyde polymer is prepared following the procedure of Example 4, employing 0.026 millimol of stannic chloride as the polymerization catalyst. In this example the reaction is carried out at 0° C. for a time period of 4½ hours. After the reaction, the polymer is treated and reclaimed as outlined in Example 4. The polymer product of this example is obtained in 57 percent yield, based on the weight of the dichloroacetaldehyde monomer used. This product is a hard, granular material having a similar melting point to the previous examples. It has a reduced viscosity of 2.06, i.e., has an average polymer molecular weight of 62,000. Films and moldings prepared from this polymer product are tough and transparent and are likewise similar in other properties to the fabricated products prepared from the high molecular weight polymer products of the previous examples.

Example 6

Following the polymerization procedure as described in Example 1, a dichloroacetaldehyde polymer is prepared at a reaction temperature of −40° C., employing 28.3 g. of freshly distilled dichloroacetaldehyde monomer, 32.8 g. of trichloroethylene solvent and 0.5 milliliters of an 0.5 molar solution of aluminum bromide in toluene (0.25 millimol of catalyst per mole of monomer). The reaction is conducted for 45 minutes, after which polymerization is terminated by the addition of methanol. The polymer product is separated and dried as described in Example 1. Twenty and eight-tenths grams (74 percent yield) of a fine, white polymeric material is recovered, which melts at approximately 230° C. It has a reduced viscosity of 2.10 and is similar in structure to the high molecular weight polymer products of the previous examples, as indicated by infrared analysis. Clear, tough films and moldings are prepared from the polymer processed as described in the previous examples.

While the invention has been described with particular reference to specific embodiments thereof, it is not to be so limited, since changes and modifications therein may be made which are within the full intended scope of the invention as defined by the appended claims.

What is claimed is:

1. A normally solid, easily processible thermoplastic polymer comprising a homopolymer containing per linear polymeric chain at least 180 repeating units derived from dichloroacetaldehyde monomer which have the structure

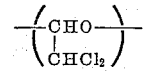

the said dichloroacetaldehyde polymer having a reduced viscosity of at least 1.0 as determined at 25° C. employing a 0.1% solution of the polymer in tetrahydrofuran and exhibiting a high degree of fire retardance.

2. A process for preparing a dichloroacetaldehyde polymer having a high average molecular weight which comprises polymerizing, under substantially anhydrous conditions and in the presence of a polymerization catalyst selected from the group consisting of halides of aluminum, boron, tin, titanium, zirconium, strontium, niobium, and coordinate complexes of such metal halides with organic compounds in which oxygen or sulfur is the donor atom, dichloroacetaldehyde monomer which has the structure CHCl₂—CHO and recovering a solid polymer having an average molecular weight of at least 20,000.

3. The process of claim 2 in which the catalyst is a boron trifluoride coordinate complex with an organic compound in which oxygen is the donor atom.

4. A process for preparing a normally solid dichloroacetaldehyde polymer which comprises polymerizing under substantially anhydrous conditions, at a temperature ranging between −40° and +30° C. and for a time period of from 1 hour to 22 hours, dichloroacetaldehyde monomer in the presence of between about 0.01 to about 4 millimols per mole of monomer, of a polymerization catalyst selected from the group consisting of halides of aluminum, boron, tin, titanium, zirconium, strontium, niobium and coordinate complexes of such metal halides with organic compounds in which the donor atom is selected from the group consisting of oxygen and sulfur; and recovering a solid dichloroacetaldehyde polymer having an average molecular weight of at least 20,000.

5. The process of claim 4 in which the reaction is conducted at a temperature ranging between $-10°$ and $+10°$ C., and for a time period of 2 to 5 hours.

6. The process of claim 4 in which the catalyst is a boron trifluoride coordinate complex with an organic compound in which oxygen is the donor atom.

7. The process of claim 4 in which the catalyst is niobium pentachloride.

8. The process of claim 4 in which the catalyst is stannic chloride.

9. The process of claim 4 in which the catalyst is employed in an amount ranging between 0.04 to 1 millimol per mole of monomer.

10. A process for preparing a normally solid dichloroacetaldehyde polymer which comprises polymerizing, under substantially anhydrous conditions, at a temperature ranging between $-80°$ and $+35°$ C., and for a time period of from 0.5 hour to 24 hours, dichloroacetaldehyde monomer in an organic liquid solvent for the said monomer and in the presence of between 0.01 to about 4 millimols per mole of monomer, of a polymerization catalyst selected from the group consisting of halides of aluminum, boron, tin, titanium, zirconium, strontium, niobium, and coordinate complexes of such metal halides with organic compounds in which the donor atom is selected from the group consisting of oxygen and sulfur; and recovering a solid dichloroacetaldehyde polymer having an average molecular weight of at least 20,000.

11. The process of claim 10 which is conducted at a temperature if $-40°$ to $+25°$ C. and for a time period of from 1 hour to 5 hours.

12. The process of claim 10 in which the catalyst is aluminum bromide.

13. The process of claim 10 in which the catalyst is employed in an amount ranging from about 0.04 to 1 millimol per mole of monomer.

References Cited

UNITED STATES PATENTS 3,183,210   5/1965   Furukawa et al. _____ 260—67
3,183,213   5/1965   Van Lohuizen et al. ___ 260—67

FOREIGN PATENTS 911,819   12/1959   Great Britain.

OTHER REFERENCES

Novak et al., Canadian Journal of Chemistry, 37, October 1959, pp. 1722–1726.

Chattaway et al., Chemical Society Journal (Proceedings), October 1928, pp. 2709–2714.

SAMUEL H. BLECH, *Primary Examiner.*

WILLIAM H. SHORT, *Examiner.*

L. M. PHYNES, *Assistant Examiner.*